US010390614B1

(12) United States Patent
Olivier et al.

(10) Patent No.: US 10,390,614 B1
(45) Date of Patent: Aug. 27, 2019

(54) QUICK CONNECT SHELF SYSTEM FOR A UTILITY CART

(71) Applicants: Jay Charles Olivier, Panama City, FL (US); Adam Williams, Brooklyn, NY (US)

(72) Inventors: Jay Charles Olivier, Panama City, FL (US); Adam Williams, Brooklyn, NY (US)

( * ) Notice: Subject to any disclaimer, the term of this patent is extended or adjusted under 35 U.S.C. 154(b) by 0 days.

(21) Appl. No.: 16/048,563

(22) Filed: Jul. 30, 2018

(51) Int. Cl.
*A47B 57/46* (2006.01)
*B62B 5/00* (2006.01)
*A47B 57/36* (2006.01)
*A47B 31/00* (2006.01)
*B62B 3/00* (2006.01)

(52) U.S. Cl.
CPC .............. *A47B 57/46* (2013.01); *A47B 31/00* (2013.01); *A47B 57/36* (2013.01); *B62B 5/00* (2013.01); *A47B 2031/003* (2013.01); *B62B 3/002* (2013.01)

(58) Field of Classification Search
CPC ......... A47B 57/46; A47B 57/48; A47B 57/12; A47B 57/18; A47B 57/44; A47B 57/36; A47B 2031/003; B62B 3/002; B62B 3/005; B62B 3/02
See application file for complete search history.

(56) References Cited

U.S. PATENT DOCUMENTS

| 4,066,022 | A | * | 1/1978 | Graves | A47B 96/02 108/14 |
| 4,142,329 | A | * | 3/1979 | Williams | E02D 29/1427 49/465 |
| 2002/0166934 | A1 | * | 11/2002 | Marsh | A47B 57/48 248/235 |
| 2006/0218858 | A1 | * | 10/2006 | Korte | A01G 9/143 47/39 |
| 2013/0146553 | A1 | * | 6/2013 | Preidt | A47F 5/00 211/153 |
| 2014/0001136 | A1 | * | 1/2014 | Yeh | A47B 47/00 211/186 |
| 2017/0057531 | A1 | * | 3/2017 | Nowe | B62B 3/005 |

FOREIGN PATENT DOCUMENTS

EP     0451012 A1 * 10/1991 ........... A47B 47/024
GB     853358 A   * 11/1960 ............. A47B 31/00

* cited by examiner

*Primary Examiner* — Daniel J Rohrhoff
(74) *Attorney, Agent, or Firm* — Plager Schack LLP; Mark H. Plager; Kara Verryt

(57) ABSTRACT

A quick connect shelf system for a utility cart may include a shelf; a plurality of shelf mounting units attached to a bottom surface the shelf; a plurality of shelf mounting anchors attached to handles on the utility cart, and a bolt removably attaching the shelf mounting units to the shelf mounting anchors.

7 Claims, 4 Drawing Sheets

QUICK CONNECT SHELF SYSTEM FOR A UTILITY CART

BACKGROUND

The embodiments described herein relate generally to utility cart accessories, and more particularly, to a quick connect shelf system for a multi-purpose utility cart.

Existing shelf systems for multi-carts are awkward and difficult to attach and detach. Specifically, they tend to use nuts and bolts to the pre-existing holes in the handles of the cart. As a result, they are difficult to put on and take off by one person. An alternate system requires attachment of an anchor with a nut and bolt for semi-permanent installation. The shelf then hangs on the anchor. However, when the shelf is in place, the cart cannot be folded as designed, making storage and transportation more difficult. Moreover, the alternate system is not stable, which can result in dropped and damaged tools, possessions, and the like.

Therefore, what is needed is a quick and easy connect shelf system to removably engage with a utility cart, wherein the shelf system is stable and strong.

SUMMARY

Some embodiments of the present disclosure include a quick connect shelf system for a utility cart. The shelf system may include a shelf; a plurality of shelf mounting units attached to a bottom surface the shelf; a plurality of shelf mounting anchors attached to handles on the utility cart, and a bolt removably attaching the shelf mounting units to the shelf mounting anchors.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
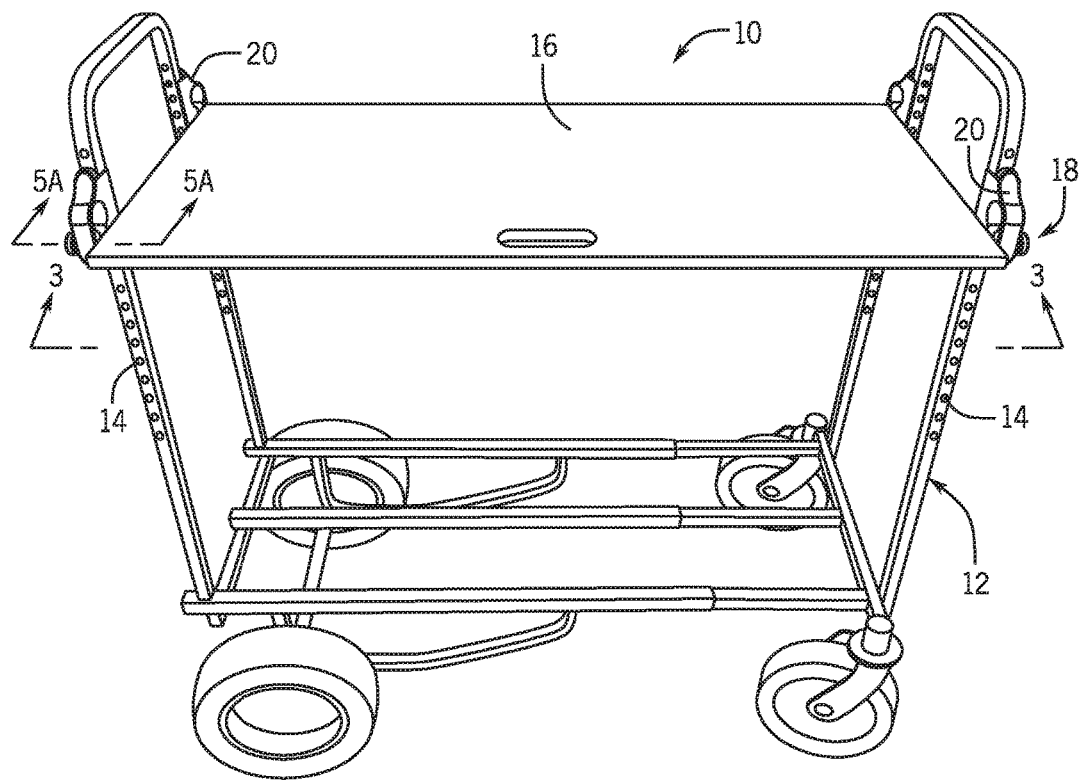
FIG. 1 is a front perspective view of one embodiment of the present disclosure, shown in use.
Figure 3:
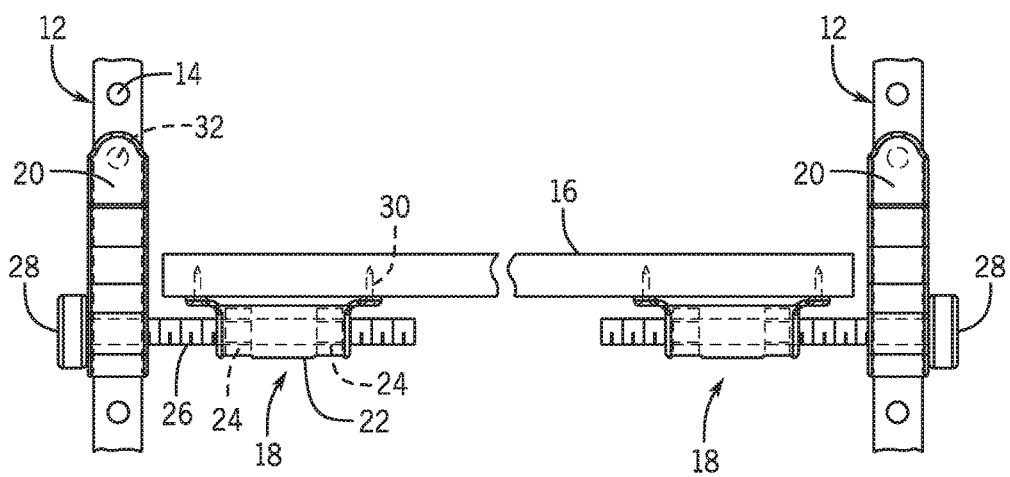
FIG. 3 is a front elevation view taken on line 3-3 of FIG. 1.
Figure 2:
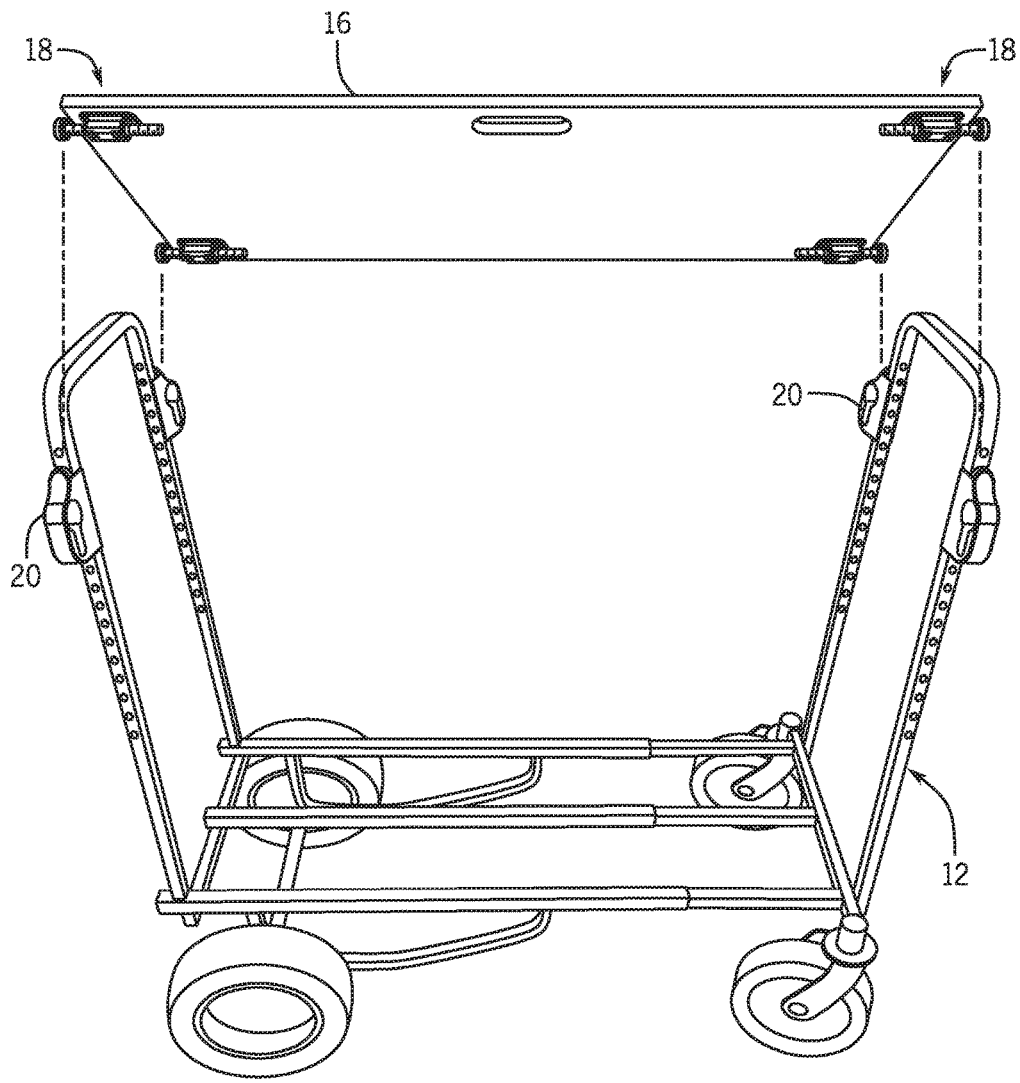
FIG. 2 is an exploded perspective view of one embodiment of the present disclosure.
Figure 4:
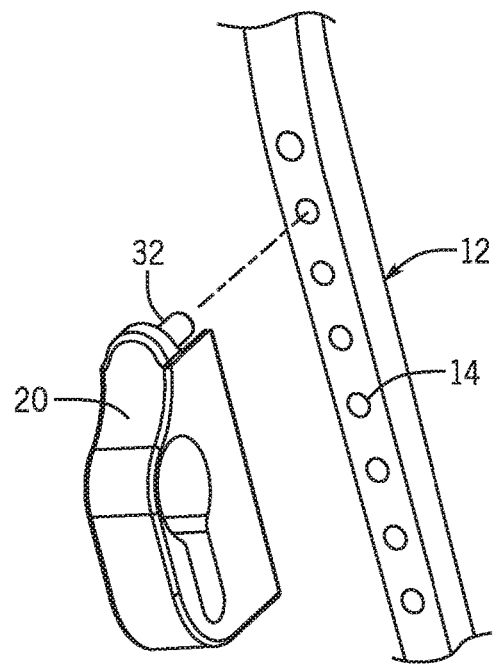
FIG. 4 is a detail exploded perspective view of one embodiment of the present disclosure.
Figure 5A:
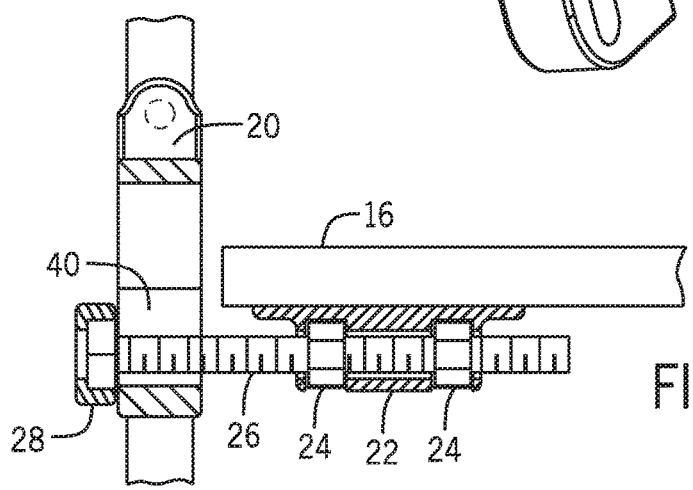
FIG. 5A is a cross-sectional view of one embodiment of the present disclosure, taken along line 5A-5A of FIG. 1.
Figure 5B:
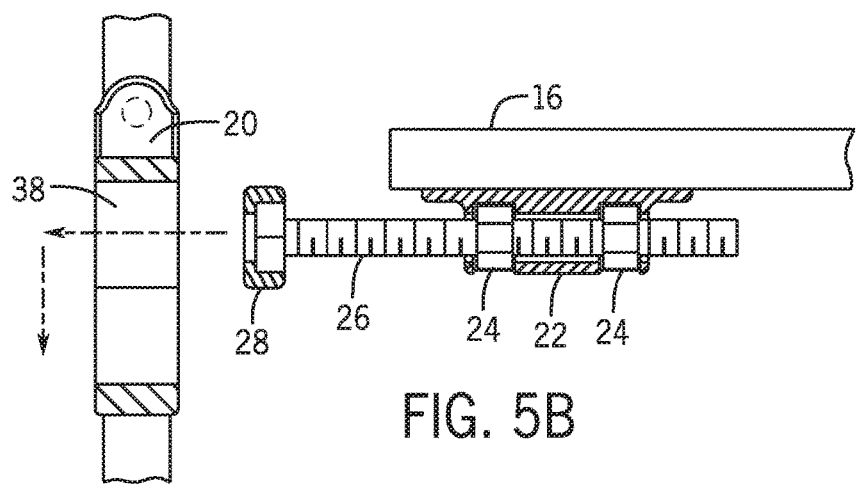
FIG. 5B is an exploded cross-sectional view similar to FIG. 5A.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a shelf system for a utility cart and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Shelf
b. Shelf Mounting Unit

The various elements of the device of the present disclosure may be related in the following exemplary fashion. It is not intended to limit the scope or nature of the relationships between the various elements and the following examples are presented as illustrative examples only.

By way of example, and referring to FIGS. 1-8, some embodiments of the present disclosure include a quick connect shelf system 10 for a utility cart 12, the shelf system 10 comprising a shelf 16; a plurality of shelf mounting units 18 attached to a bottom surface the shelf 16; and a plurality of shelf mounting anchors 20 attached to handles on the utility cart 12, wherein the plurality of shelf mounting units 18 are positioned on the bottom surface of the shelf 16 such that each shelf mounting unit 18 removably engages with a shelf mounting anchor 20 when the shelf 16 is positioned between the handles of the utility cart 12.

As shown in the Figures, a shelf mounting unit 18 may be positioned on the bottom surface of the shelf 16 proximate to each corner of the shelf 16. Thus, in embodiments, the shelf 16 may have four shelf mounting units 18 attached thereto. As shown in FIGS. 3, 5A, 5B, and 8, each shelf mounting unit 18 may comprise a unit body 22 designed to be secured to the bottom surface of the shelf 16. For example, the unit body 22 may include a planar surface 21 designed to be positioned against the bottom surface of the shelf 16, wherein the planar surface 21 includes a plurality of fastener orifices extending therethrough, the fastener orifices sized to accommodate a fastener, such as a screw 30, extending therethrough to permanently attach the unit body 22 to the shelf 16. The unit body 22 may also comprise a protrusion extending from the planar surface 21 away from the shelf 16, wherein the protrusion has a channel running therethrough, the channel defining a bolt channel 25 sized to accommodate a bolt 26. The bolt channel 25 may run parallel to a bottom surface of the shelf 16 when the unit body 22 is attached to the shelf 16. The protrusion may also include at least one, such as two, adjustment nut notches 23, each sized to accommodate an adjustment nut 24 therein. An adjustment nut 24 may be positioned within each adjustment nut compartment 23 prior to the bolt 26 being positioned within the bolt channel 16. As such, when the bolt 26 is inserted into the bolt channel 16, it also passes through the adjustment nut(s) 24.

As shown in the Figures, the shelf mounting anchor 20 may be designed to removably attach to handles of the utility cart 12. For example, the shelf mounting anchor 20 may be designed to removably engage with preexisting adjustment orifices 14 extending through the handles. As such, the height of the shelf 16 with respect to the utility cart 12 may be varied vertically up and down, as required or desired. Specifically, the shelf mounting anchor 20 may include an alignment channel 34 extending into a first surface thereof. The alignment channel 24 may run along the entire length of the shelf mounting anchor 20 and may be sized to accommodate the handle of the utility cart 12 therein. For example, the alignment channel 24, when positioned on the utility cart 12, may surround three edges of the handle. A pin 32 may extend from an interior surface of the alignment channel 24 away from the remaining portion of the shelf mounting anchor 20, such that the pin 32 is substantially perpendicular to the portion of the handle positioned within the alignment channel 24. The pin 32 may be sized to fit within the adjustment orifices 14 on the handles. Thus, the pin 32 may be inserted into one of the adjustment orifices 14, resulting in the handle being positioned within the alignment channel 24. In some embodiments, an interior surface of the alignment channel 24 may include at least one magnet 26 positioned therein. The magnet(s) 26 may help prevent the handle of the utility cart 12 from unintentionally being removed from the alignment channel 34.

Figure 6:
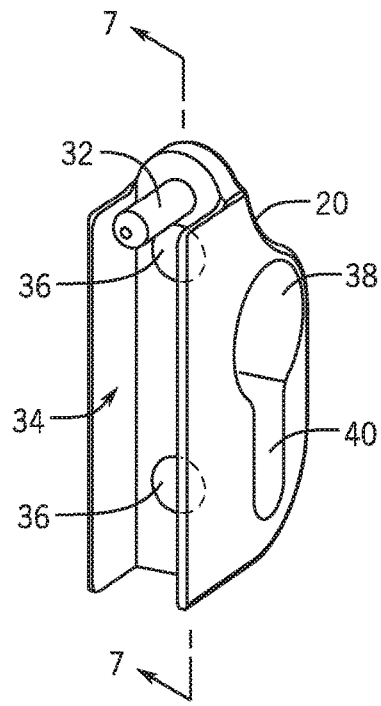
FIG. 6 is a detail perspective view of an anchor of the present disclosure.
Figure 7:
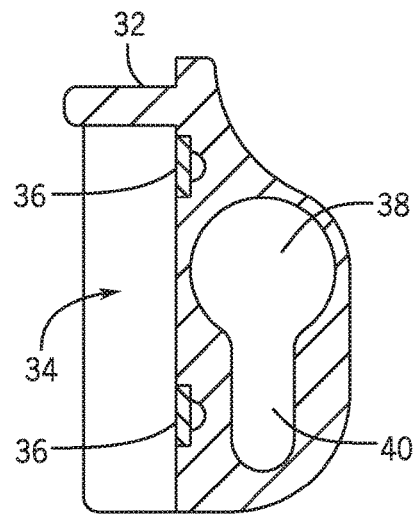
FIG. 7 is a cross-sectional view of one embodiment of the present disclosure taken on line 7-7 of FIG. 6.
Figure 8:
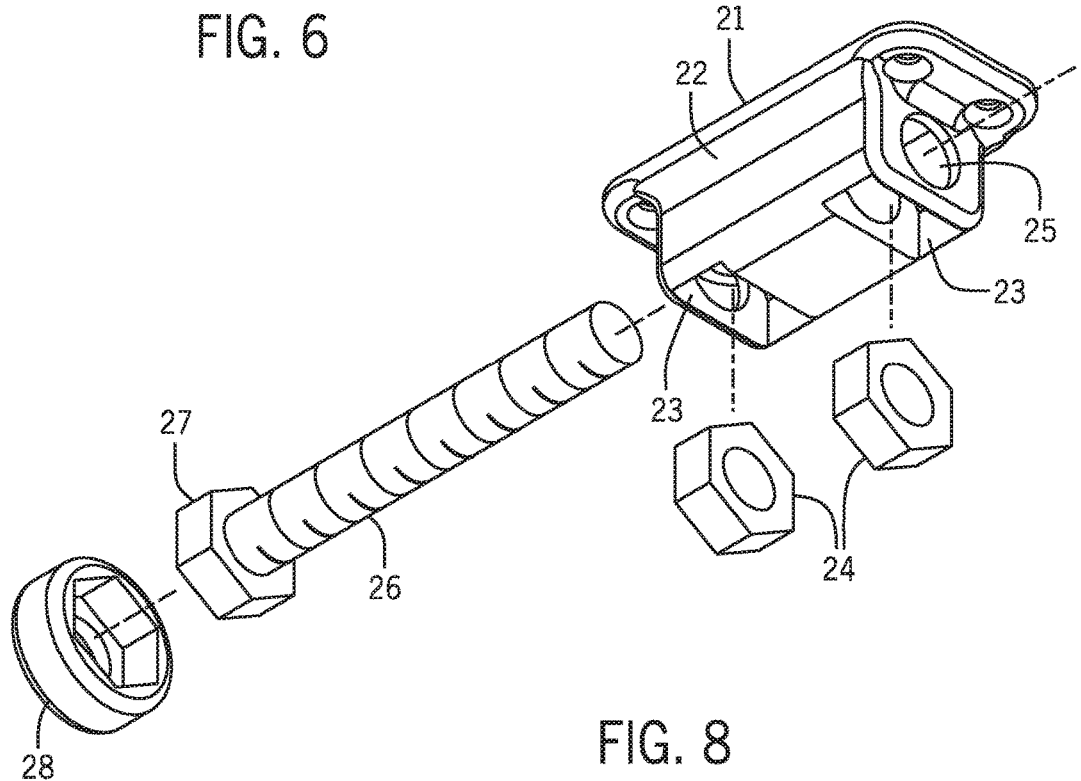
FIG. 8 is a detail exploded prospective view of one embodiment of the present disclosure.

As shown in at least FIGS. 6 and 7, the shelf mounting anchor 20 may further comprise an orifice, such as a keyhole-shaped orifice, extending therethrough. The orifice may comprise a bolt orifice 38 with an alignment slot 40 extending downward form the bolt orifice 38 portion. The bolt orifice 38 may be sized to accommodate a bolt head 27 with or without a bolt cap 28 extending therethrough. The alignment slot 40 may have a diameter or width smaller than the diameter of the bolt orifice 38, but large enough to accommodate the shaft of the bolt 26 therein. As such, the bolt may be inserted through the bolt orifice 38 and then pushed vertically downward, such that the bolt shaft 26 extends through the alignment slot 40. However, because the alignment slot may have a width or diameter less than the diameter of the bolt head 27 and/or bolt cap 28, the bolt 26 may not be able to be pulled out of the orifice through the alignment slot 38. The orifice may define an anchor bolt channel, wherein the anchor bolt channel may be substantially perpendicular to the alignment channel 24, such that when a bolt 26 is positioned within the anchor bolt channel, the bolt 26 is substantially perpendicular to the portion of the utility cart handle positioned within the adjustment channel 34.

The shelf system 10 of the present disclosure may be made of any suitable or desired materials. The shelf 16 may be sized to fit snugly between the handles of the utility cart 12. As a result of the structure of the shelf system 10 of the present disclosure, the shelf system may be easily attached or detached from the utility cart 12, and it may improve the stability of the utility cart 12 itself. Moreover, the shelf system 10 may be able to support a substantial amount of weight, such as up to 200 pounds or more.

As shown in the Figures, to use the shelf system 10 of the present disclosure, shelf mounting anchors 20 may be attached to each arm of the utility cart handles. The shelf mounting anchors 20 may be attached by allowing the pin 32 on a shelf mounting anchor 20 to be inserted into an adjustment hole 14 on the utility cart handle, while will result in the portion of the utility cart handle proximate to the chosen adjustment hole 14 to be positioned within the adjustment channel 34. In some embodiments, the utility cart 12 may comprise a pair of handles, each handle comprising two arms. A shelf mounting anchor 20 may be attached to each arm of each handle, wherein the height of all of the shelf mounting anchors 20 should be the same to provide a planar shelf system 10. A plurality of shelf mounting units 18 may be attached to a bottom surface of the shelf 16 and, in some instances, may be positioned proximate to each corner of the shelf 16. A bolt 26 may be inserted into each shelf mounting unit 18 with the bolt head 27 extending outward from the shelf mounting unit 18 past the end of the shelf 16. The bolt head 27 may then be inserted into the shelf mounting anchor 20 such that it passes through the bolt orifice 38 and out the other side of the shelf mounting anchor 20. The shelf 16 may then be pressed vertically downward, causing the shaft of the bolt 26 to be positioned within the adjustment slot 40. To remove the shelf 16 from the cart 12, the reverse process may be followed.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A quick connect shelf system for a utility cart, the shelf system comprising:
   a shelf;
   a plurality of shelf mounting units attached to a bottom surface the shelf;
   a plurality of shelf mounting anchors attached to handles on the utility cart, and
   a bolt engaging each shelf mounting unit with a corresponding shelf mounting anchor,
   wherein:
   the plurality of shelf mounting units are positioned on the bottom surface of the shelf such that each shelf mounting unit removably engages with a corresponding shelf mounting anchor when the shelf is positioned between the handles of the utility cart;
   the shelf mounting anchor comprises an alignment channel extending into a first surface;
   the alignment channel extends along an entire length of the shelf mounting anchor and is sized to accommodate the handle of the utility cart therein;
   the shelf mounting anchor further comprises an orifice extending therethrough, the orifice comprising a bolt orifice with an alignment slot extending downward from the bolt orifice;
   the bolt orifice has a diameter larger than a diameter of a bolt head on the bolt positioned within the shelf mounting unit; and
   the alignment slot has a width smaller than the diameter of the bolt head but larger than a diameter of a shaft of the bolt.

2. The quick connect shelf system of claim 1, wherein each shelf mounting unit comprises:
   a unit body designed to be secured to the bottom surface of the shelf,
   wherein the unit body comprises a planar surface designed to be positioned against the bottom surface of the shelf.

3. The quick connect shelf system of claim 2, wherein:
   the unit body further comprises a protrusion extending from the planar surface and away from the shelf, the protrusion including a bolt channel extending therethrough, the bolt channel sized to accommodate the bolt; and
   the bolt channel is parallel to the bottom surface of the shelf when the unit body is attached to the shelf.

4. The quick connect shelf system of claim 3, wherein:
   the protrusion includes at least one adjustment nut notch;
   an adjustment nut is positioned with the adjustment nut notch.

5. The quick connect shelf system of claim 1, further comprising a pin extending from an interior surface of the alignment, wherein the pin is sized to fit within an adjustment orifice on the handle.

6. The quick connect shelf system of claim 1, wherein an interior surface of the alignment channel includes at least one magnet positioned therein.

7. The quick connect shelf system of claim 1, wherein the orifice is substantially key-hole shaped.

\* \* \* \* \*